United States Patent
Morper et al.

(10) Patent No.: US 11,323,954 B2
(45) Date of Patent: May 3, 2022

(54) METHOD AND APPARATUS FOR SELECTING NETWORK SLICES AND SERVICES

(71) Applicant: NOKIA SOLUTIONS AND NETWORKS OY, Espoo (FI)

(72) Inventors: Hans-Jochen Morper, Erdweg (DE); Rainer Liebhart, Munich (DE); Devaki Chandramouli, Plano, TX (US); Wolfgang Hahn, Bergfelde (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 120 days.

(21) Appl. No.: 15/999,831

(22) PCT Filed: Feb. 14, 2017

(86) PCT No.: PCT/EP2017/053213
§ 371 (c)(1),
(2) Date: Aug. 20, 2018

(87) PCT Pub. No.: WO2017/140644
PCT Pub. Date: Aug. 24, 2017

(65) Prior Publication Data
US 2021/0297938 A1    Sep. 23, 2021

Related U.S. Application Data

(60) Provisional application No. 62/296,881, filed on Feb. 18, 2016.

(51) Int. Cl.
*H04W 48/18* (2009.01)
*H04W 40/02* (2009.01)
(Continued)

(52) U.S. Cl.
CPC .......... *H04W 48/18* (2013.01); *H04W 40/02* (2013.01); *H04W 48/17* (2013.01); *H04W 88/06* (2013.01)

(58) Field of Classification Search
USPC .................................................. 370/312, 330
See application file for complete search history.

(56) References Cited

U.S. PATENT DOCUMENTS 5,319,777 A * 6/1994 Perez ................... G06Q 10/10
9,392,471 B1 * 7/2016 Thomas ............... H04W 16/32
(Continued)

FOREIGN PATENT DOCUMENTS

| CN | 101873323 A | 10/2010 |
| CN | 103269282 A | 8/2013 |
| WO | 2014/052750 A2 | 4/2014 |

OTHER PUBLICATIONS

Office Action issued in Thailand Patent Application No. 1801004888.
(Continued)

*Primary Examiner* — Kiet M Doan
(74) *Attorney, Agent, or Firm* — Squire Patton Boggs (US) LLP

(57) ABSTRACT

A method and apparatus may include providing a multi-dimensional descriptor to a network function. The method may also include accessing a network slice. The network slice is selected based on the multi-dimensional descriptor. The method may also include accessing a component of the network slice. One or more network functions of the network slice are selected based on the multi-dimensional descriptor.

14 Claims, 6 Drawing Sheets

(51) Int. Cl.
    *H04W 48/00*    (2009.01)
    *H04W 88/06*    (2009.01)

(56) References Cited

U.S. PATENT DOCUMENTS

2014/0089504 A1* 3/2014 Scholz .................. H04L 43/062
    709/224
2015/0063166 A1    3/2015  Sif et al.

OTHER PUBLICATIONS

Nov. 19, 2019 Office Action issued in Singapore Patent Application No. 11201806967T.
3GPP 3GPP TR 22.864 V0.3.0 (Feb. 2016); 2016; 3rd Generation Partnership Project; Technical Specification Group Services and System Aspects; Feasibility Study on New Services and Markets Technology Enablers—Network Operation;Stage 1 (Release 14).
First Examination Report dated May 27, 2020 corresponding to Indian Patent Application No. 201817030867, with English translation thereof.
International Search Report & Written Opinion dated May 8, 2017 corresponding to International Patent Application No. PCT/EP2017/053213.
Jean Cai Zuanhua et al.: "5G Vision and Key Access and Networking Technologies," Dec. 7, 2015, XP055361273, retrieved from Internet: http://www.winlab.rutgers.edu/iab/2015-02/Slides/04.pdf.
Aug. 6, 2020 Office Action issued in Chinese Patent Application No. 201780024331.0.
Sep. 5, 2019 Office Action issued in Indonesian Patent Application No. PID201806943 with translation.
Notice of the Result of Substantive Examination Pursuant to Article 62(3) of Indonesian Patent Law No. 13/2016 dated May 20, 2021 corresponding to Indonesian Patent Application No. PID201806943 with English translation thereof.
Substantive Examination Report issued in corresponding Malaysian Patent Application No. PI 2018001468, dated Oct. 20, 2021.

* cited by examiner

METHOD AND APPARATUS FOR SELECTING NETWORK SLICES AND SERVICES

BACKGROUND

Field

Certain embodiments of the present invention may relate to selecting network slices and services.

Description of the Related Art

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may include providing, by a user equipment, a multi-dimensional descriptor to a network function. The method may also include accessing a network slice, wherein the network slice is selected based on the multi-dimensional descriptor. The method may also include accessing a component of the network slice. One or more network functions of the network slice are selected based on the multi-dimensional descriptor.

In the method of the first embodiment, the network function comprises a radio access network function.

In the method of the first embodiment, the accessing the network slice includes accessing a network slice that is selected based on selection parameters provided by the user equipment.

In the method of the first embodiment, the user equipment requests at least one of a service requiring session continuity, a service that requires an efficient user plane path, and a service requiring a session on demand.

According to a second embodiment, an apparatus may include at least one processor. The apparatus may also include at least one memory including computer program code. The at least one memory and the computer program code may be configured, with the at least one processor, to cause the apparatus at least to provide a multi-dimensional descriptor to a network function. The apparatus may also be caused to access a network slice. The network slice is selected based on the multi-dimensional descriptor. The apparatus may also be caused to access a component of the network slice. One or more network functions of the network slice are selected based on the multi-dimensional descriptor.

In the apparatus of the second embodiment, the network function includes a radio access network function.

In the apparatus of the second embodiment, the accessing the network slice includes accessing a network slice that is selected based on selection parameters provided by the apparatus.

In the apparatus of the second embodiment, the apparatus requests at least one of a service requiring session continuity, a service that requires an efficient user plane path, and a service requiring a session on demand.

According to a third embodiment, a computer program product may be embodied on a non-transitory computer readable medium. The computer program product configured to control a processor to perform a method according to the first embodiment.

According to a fourth embodiment, a method may include receiving, by a network node, a multi-dimensional descriptor from a user equipment. The method may also include selecting a network slice for the user equipment. The network slice is selected based on the multi-dimensional descriptor. The method may also include selecting a component of the network slice, for the user equipment. One or more network functions of the network slice are selected based on the multi-dimensional descriptor.

In the method of the fourth embodiment, the network node includes a radio access network node or a network function.

In the method of the fourth embodiment, the selecting the network slice comprises selecting a network slice that is selected based on selection parameters provided by the user equipment.

In the method of the fourth embodiment, the user equipment requests at least one of a service requiring session continuity, a service that requires an efficient user plane path, and a service requiring a session on demand.

According to a fifth embodiment, an apparatus may include at least one processor. The apparatus may also include at least one memory including computer program code. The at least one memory and the computer program code may be configured, with the at least one processor, to cause the apparatus at least to receive a multi-dimensional descriptor from a user equipment. The apparatus may also be caused to select a network slice for the user equipment, wherein the network slice is selected based on the multi-dimensional descriptor. The apparatus may also be caused to select a component of the network slice, for the user equipment. One or more network functions of the network slice are selected based on the multi-dimensional descriptor.

In the apparatus of the fifth embodiment, the apparatus may include a radio access network node or a network function.

In the apparatus of the fifth embodiment, the selecting the network slice may include selecting a network slice that is selected based on selection parameters provided by the user equipment.

In the apparatus of the fifth embodiment, the user equipment requests at least one of a service requiring session continuity, a service that requires an efficient user plane path, and a service requiring a session on demand.

According to a sixth embodiment, a computer program product may be embodied on a non-transitory computer readable medium, the computer program product configured to control a processor to perform a method according to the fourth embodiment.

BRIEF DESCRIPTION OF THE DRAWINGS

For proper understanding of the invention, reference should be made to the accompanying drawings, wherein.

DETAILED DESCRIPTION

Figure 1:
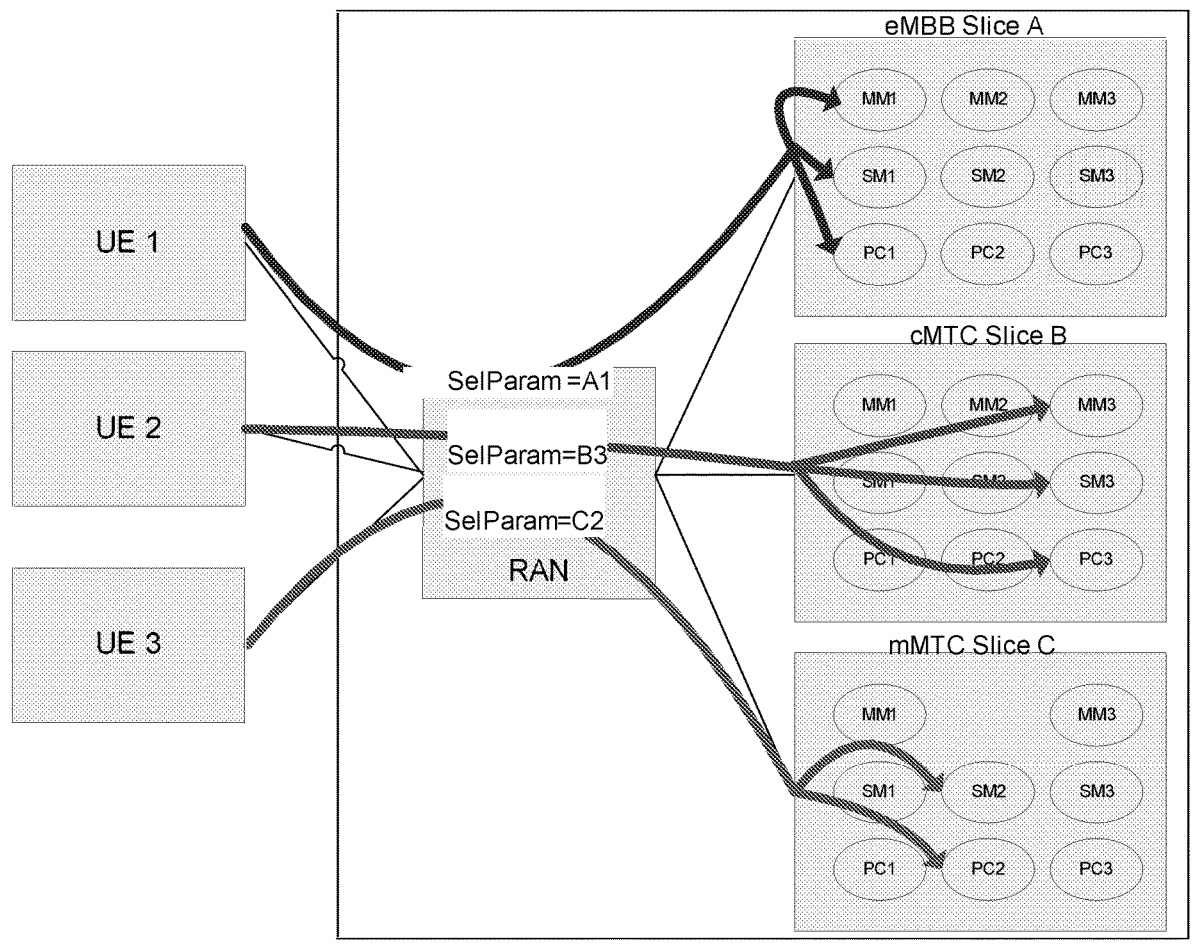
FIG. 1 illustrates performing a multi-dimensional network slice selection, in accordance with certain embodiments.

Certain embodiments of the present invention may relate to selecting network slices and services. 5th Generation (5G) is a new generation of radio systems and network architecture. 5G delivers extreme broadband connectivity that is ultra-robust and that is characterized by low latency. 5G also delivers massive machine-to-machine connectivity for Internet of Things (IoT) in order to enable the programmable world. Providing such connectivity may transform our individual lives, economy, and society.

The features and corresponding technical requirements of 5G are clearly defined. The industry has widely adopted the following use categories for 5G:

1. One use category relates to implementing massive broadband that delivers gigabytes of bandwidth data per second on demand (the delivery of the gigabytes of bandwidth data may occur in uplink and/or in downlink);
2. Another use category relates to implementing critical, machine-type communication (with extremely low end-to-end latency) that provides immediate and synchronous eye-hand feedback. This eye-hand feedback may enable remote control of robots and cars;
3. Another use category relates to implementing massive machine-type communication that may connect billions of sensors and machines.

One difference between 4G technology and 5G technology relates to the diversity of use-cases that 5G networks support as compared to the use-case that is supported by 4G networks. 4G networks were primarily designed for the single use-case of delivering high-speed mobile broadband communication.

5G may bring about a new family of radio-access-technologies. The architecture of 5G may expand to multiple dimensions by providing a common core for multiple radio technologies (such as cellular, Wi-Fi, and/or fixed radio link technologies). The architecture of 5G may also provide a common core for multiple services (such as Internet-of-Things (IoT), mobile broadband, and/or low latency-high reliability). The architecture of 5G may also provide a common core for multiple network and service operators.

SA2 agreed to the following requirements for Network slicing: "Network slicing enables the operator to create networks customised to provide optimized solutions for different market scenarios which demands diverse requirements, e.g. in the areas of functionality, performance and isolation. Solutions for this key issue will study:
Functionality and capabilities within 3GPP scope that enables the next generation system to support the Network Slicing and Network Slicing Roaming requirements defined in TR 22.864 [a] and in normative stage 1 specifications (when available), including but not limited to:
How to achieve isolation/separation between network slice instances and which levels and types of isolation/separation will be required;
Which network functions may be included in a specific network slice instance, and which network functions are independent of network slices;
The procedure(s) for selection of a particular Network Slice for a UE;"

3GPP has specified solutions for the selection of core networks. For example, 3GPP Release 12 uses a low-priority indicator-based selection solution. 3GPP Release 13 uses UE redirection towards a dedicated core network (DECOR) and an eDECOR. However, all these approaches generally provide only the means to select a certain dedicated core network, based on the Evolved Packet Core architecture (i.e., an architecture containing certain Mobility Management Entity (MME) and/or Serving-Gateway/PDN-Gateway (SGW/PGW)).

The approaches of 3GPP Release 12 and Release 13 do not provide the mechanisms, nor the flexibility, to select between dedicated networks that have different underlying architectures. The approaches of Release 12 and Release 13 also do not provide mechanisms to determine whether a certain functional component needs to be included in a dedicated network. In the future, major changes in the functional architecture are envisioned:

1. One change is that the granularity of the network functions may be much finer compared to the current granularity of EPC with MME, S-GW/P-GW, and Policy-and-Charging-Rules Function (PCRF).
2. Another change is that there may be a move from product-specific application architectures into a layered and modular Service Architecture.
3. Another change is that there may be a move from pre-packaged and fixed products (and programs) to a micro-service architecture with shared product components. This change may enable X component releases/year and may enable a continuous delivery of products.

In consideration of the above, with certain embodiments, the network may be able to select a right network slice. The network may also be able to select the right functional components, within a network slice, for a user equipment (UE). Currently, 3GPP provides solutions to steer the UE to the right dedicated core network. However, 3GPP does not help determine which network function(s) is necessary for what service, as 3GPP does not currently offer micro-services in operator networks. The offering of micro-services may be one of the differentiators between an LTE dedicated core network and a network that performs slicing in accordance with 5G.

Certain embodiments of the present invention are directed to a multi-dimensional descriptor. The multi-dimensional descriptor may be an application descriptor and/or service descriptor, for example. The multi-dimensional descriptor may be configured in a UE and may be reported to the network. The multi-dimensional descriptor may enable addressing/accessing of a particular network slice and/or may enable addressing/accessing of particular components of the particular network slice. The multi-dimensional descriptor enables a multi-dimensional selection scheme, where different types/flavors of network slices, which support the same or similar applications, can be selected.

The following describes why a multi-dimensional descriptor may be necessary, and the following illustrates how the multi-dimensional descriptor may be used:

a. In one example, a mobile broadband UE can request a service that requires session continuity for a certain application. In this case, the network may choose functional entities that are necessary to support seamless mobility, to support session management (to maintain bearers), and to support other relevant functions (such as policy control and security).

b. In another example, a stationary IoT UE can request a service that requires an on-demand session for a certain application. In this case, the network may choose functional entities that are necessary to support on-demand sessions. The network may also choose functionality entities that offer basic mobility or no mobility.

c. In another example, a critical Machine Time Communication (MTC) UE can request a service that requires efficient user plane path management for a certain application. In this case, the network may choose functional entities that are necessary to support a low-latency user-plane path and that, at the same time, offer support for route optimization, as needed, due to UE mobility.

With certain embodiments, using the multi-dimensional descriptors for network slicing may be described as follows:

If the multi-dimensional descriptor has one dimension (where <dim>=1), then there may be only one implementation for each network slice type.

If the multi-dimensional descriptor has two dimensions (where <dim>=2), then there may be several implementations for different network slice types, in parallel. For each network slice type, there may be more than one implementation. For example, each network slice type may have different implementations to distinguish between different users (e.g., to distinguish between "platinum" users, "gold" users, and "silver" users). By having different implementations for each network slice type, each implementation may have a corresponding set of services and applications. For example, the different implementations may be distinguished from each other, for example, based on Quality-of-Service (QoS) or security characteristics.

If the multi-dimensional descriptor has three dimensions (where <dim>=3), then there may be several slices (such as "platinum," "gold," and "silver" slices) for each service type. For example, the slices may be assigned to different vertical peering customers so that different dimensions may reflect "service types" that demand specific network functions, "QoS types" for different service quality allowing for prize differentiation, and/or "peering types" to assign to internal usage or peering customers.

If the multi-dimensional descriptor has four dimensions (where <dim>=4), then each peer customer may run several same QoS service type slices with one operator, for example, to keep different user groups separate. For example, a hospital group may use a "platinum" smart phone slice for surgeons and a "platinum" smart phone slice for emergency personal. The hospital group may use a "gold" smart phone slice for all other users.

Furthermore, a UE that runs a certain application can change the UE's requirements during its lifetime. With changing requirements, it may be beneficial for the functional components within a given network slice to be able to take varying requirements into account when the slice is created. A given slice that is able to take varying requirements into account enables selection of the right functional components within the already existing network slice, rather than having to create new network slices when the requirements for an ongoing service changes.

Certain embodiments of the present invention may be directed to selecting network slices within a network-slicing framework. Certain embodiments may ensure that a UE that runs a certain application is steered to an appropriate slice. Additionally, the type of services required for the UE at any time should be taken into consideration, as future architectures should enable delivery of micro-services with agility. When delivering micro-services with agility, a set of small services may be differentiated even within a certain class of use cases. Thus, the selection principle should enable selection of the appropriate function to deliver a certain service, even within a class of functions designed for a certain use case.

In summary, the selection criteria of certain embodiments should enable the selection of proper network slices for a certain application. The selection criteria should also enable the selection of the right functional components within the network slices for a certain service requested by the UE, at any time. Different network slices, for example, may use different (3GPP or non-3GPP compliant) architectures with totally different functional components.

FIG. 1 illustrates performing a multi-dimensional network slice selection, in accordance with certain embodiments. FIG. 1 illustrates that the application running in the UE can map to a certain slice, and a service descriptor can map the UE to the set of functions that are necessary for providing the service requested by the UE. The service descriptor may be one out of 2 parameters that a UE provides. In the example of FIG. 1, a UE provides A1, and, in this case, the service descriptor maps to 1.

A service descriptor may be a data record which can be a number of bits or bytes which are assigned by a mobile network (operator) to a device of a user. Said service descriptors may be related to a (5G network) service comprising, for example, micro service type, QoS information, mobility information and/or also comprising indications to 3rd party service providers said service is associated with and may also comprise further information that will allow a mobile network (operator) to do specific associations to network resources or network slices, respectively.

There may be more than one service descriptor assigned to a device in case one device is used to access different (5G) services via a mobile network or in case one device is using different QoS flavours of a (5G) service, or in case a device is attaching to (5G) services of different service providers by a mobile network.

Service descriptors may be stored in the UE (user equipment). Service descriptors may be assigned by a mobile network (operator): upon first attach to a network, by means of pre- and post-provisioning (for example, as part of OAM), during manufacturing of SIM cards and/or some parts of the UE, and/or at any time during the lifetime of a service or device or SIM card.

In the device, services may be linked to service descriptors either: as part of the assignment procedure of a mobile network (operator), as part of an assignment procedure of a third party service provider, and/or manually by the user.

Upon service activation (e.g. user accessing a service), the associated service descriptor may be conveyed from the device to the network: either automatically as part of e.g. an authentication or authorization procedure, and/or on demand by the network The service descriptor content and structure may be only of relevance for the mobile network, the mobile device may possibly not have any knowledge about the values of a service descriptor. However, the device and its software may have to handle the correct association of a service or service activation and the corresponding service descriptor which has to be conveyed to a network upon service activation/usage.

The mechanism that performs mapping may be referred to as a multi-dimensional selection mechanism. Referring to FIG. 1, MM1, MM2, PC2, SM3, etc., represent network function modules. Within each function module, they can support varying requirements. For example, MM1 supports a certain set of mobility management functionality, while MM2 supports a different set. SelParam=A1 represents the multi-dimensional descriptor sent by the UE to the network.

In order to enable this multi-dimensional selection mechanism, with certain embodiments, the UE can provide a multi-dimensional descriptor (such as an application descriptor and/or a service descriptor, for example). This multi-dimensional descriptor can be used to select an appropriate network slice. This multi-dimensional descriptor can also be used to select, within this selected slice, appropriate network functions. Selection of the slice and the slice components that are based on the multi-dimensional descriptor can be either performed by a central entity in the network or performed by distributed various functional components. The selection can be performed stepwise (e.g., where component X selects component Y, and where component Y selects component Z, etc.).

Referring to FIG. 1, the following examples are shown: (1) a mobile broadband UE-1 can request a service requiring session continuity for a certain application, (2) a critical MTC UE-2 can request a service that requires an efficient user plane path for a certain application, and/or (3) a stationary IoT UE-3 can request a service requiring a session on demand for a certain application.

With certain embodiments, selection of a network slice is preferably performed in a Radio Access Network (RAN), based on a multidimensional descriptor. The selection of the slice components, which is based on the provided selector, can be either performed in the RAN or in the Core network. The selection of the slice components may be performed by a central entity in the network or by various functional components that are already part of the network slice. The selection of the slice and its components may be a selection of network resources that might not be directly determined by the newly introduced descriptor used by the UE.

Instead, with certain embodiments, a policy-based translation into a slice and component selection may be performed in the network.

The UE's multidimensional descriptor may be a representation of application requirements. Some parts (like the UE device type) can be used for slice selection. Other parts describing specific requirements (like the above-mentioned characteristics for mobility/service continuity) might be used for component selection. Business logic and policies inside a slice (as well as a current resource utilization) may decide what components are finally selected. For example, even if the service requirement that is expressed within the multidimensional descriptor might not need service continuity with IP address preservation, the network might decide upon and provide a mobility manager (MM) module that supports service continuity. The network may decide and provide a MM module based on available (but not utilized) resources, or because internal analytics suggest that this assignment will contribute to an overall signaling reduction or for other reasons.

Certain embodiments provide the ability for an operator to choose the right network slice and functional components in a flexible manner. Different network slices may, for example, use different (3GPP or non-3GPP compliant) architectures with totally different functional components.

With certain embodiments, the requirements of a UE that runs a certain application (and that uses, for example, an Extreme Mobile Broadband (eMBB) slice) can change during its lifetime. With changing requirements, it may be beneficial for the functional components within a given slice to take varying requirements into account when the slice is created. This enables selection of the right functional components within the already-existing network slice, rather than needing to create new network slices when the requirements change. In addition, this enables addition/removal of functional components within a slice when the requirements of applications running on a UE (that is steered to this slice) change.

Figure 2:
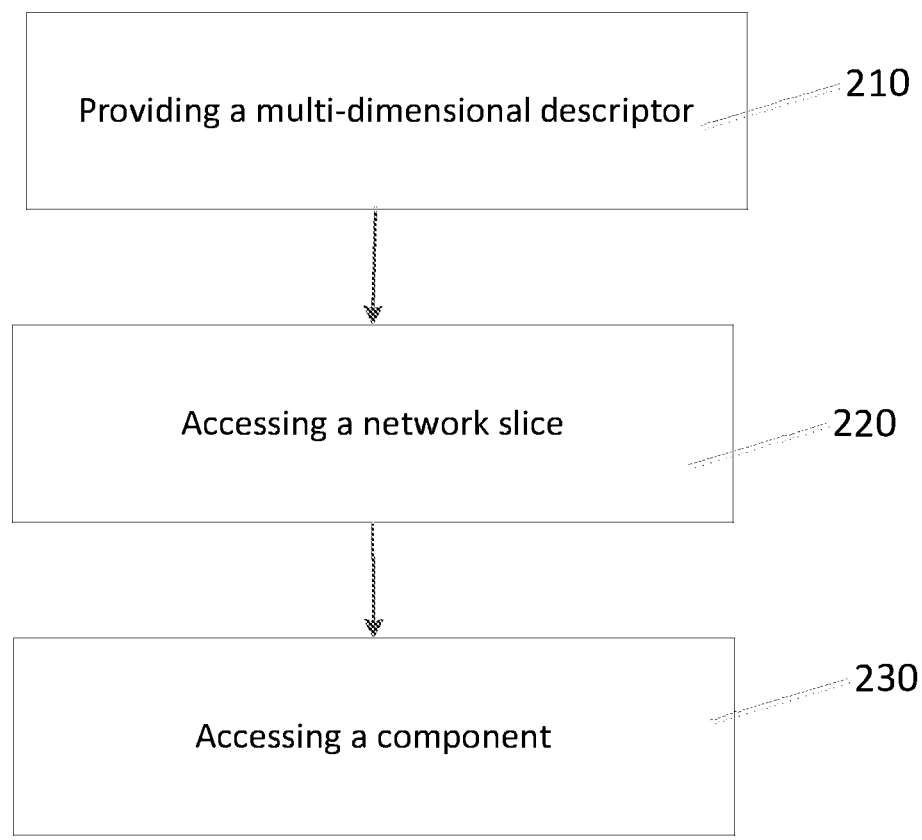
FIG. 2 illustrates a flowchart of a method in accordance with certain embodiments of the invention.

FIG. 2 illustrates a flowchart of a method in accordance with certain embodiments of the invention. The method illustrated in FIG. 2 includes, at 210, providing, by a user equipment, a multi-dimensional descriptor to a network function. The method may also include, at 220, accessing a network slice. The network slice is selected based on the multi-dimensional descriptor. The method may also include, at 230, accessing a component of the network slice. One or more network functions of the network slice are selected based on the multi-dimensional descriptor.

Figure 3:
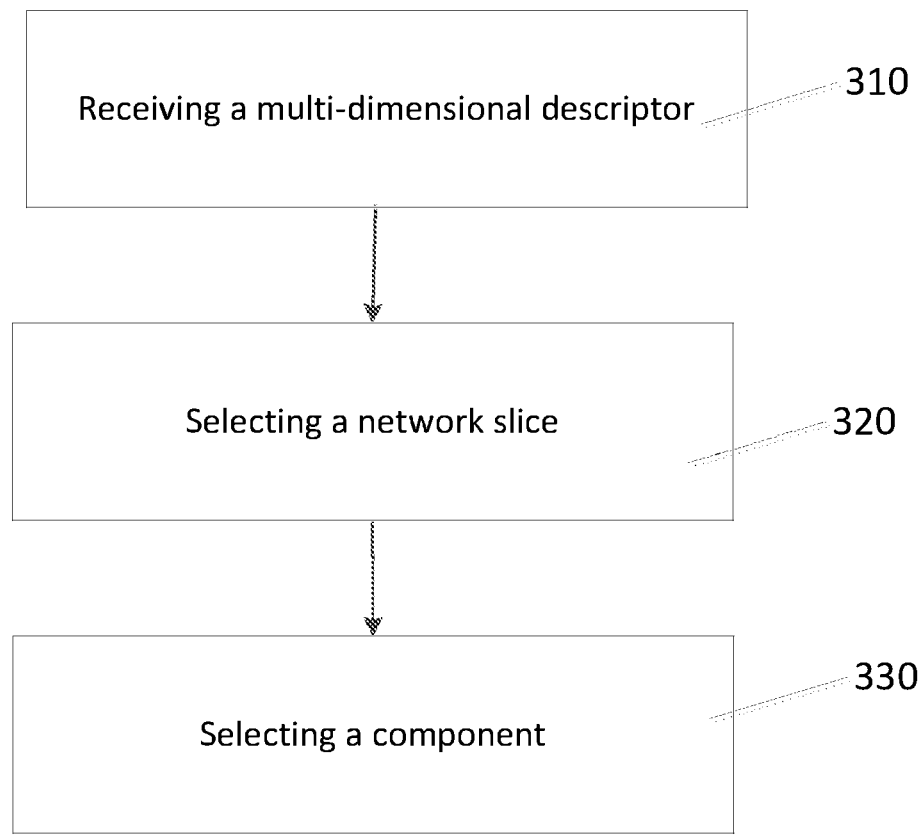
FIG. 3 illustrates a flowchart of a method in accordance with certain embodiments of the invention.

FIG. 3 illustrates a flowchart of a method in accordance with certain embodiments of the invention. The method illustrated in FIG. 3 includes, at 310, receiving, by a network node, a multi-dimensional descriptor from a user equipment. The method may also include, at 320, selecting a network slice for the user equipment. The network slice is selected based on the multi-dimensional descriptor. The method may also include, at 330, selecting a component of the network slice, for the user equipment. One or more network functions of the network slice are selected based on the multi-dimensional descriptor.

Figure 4:
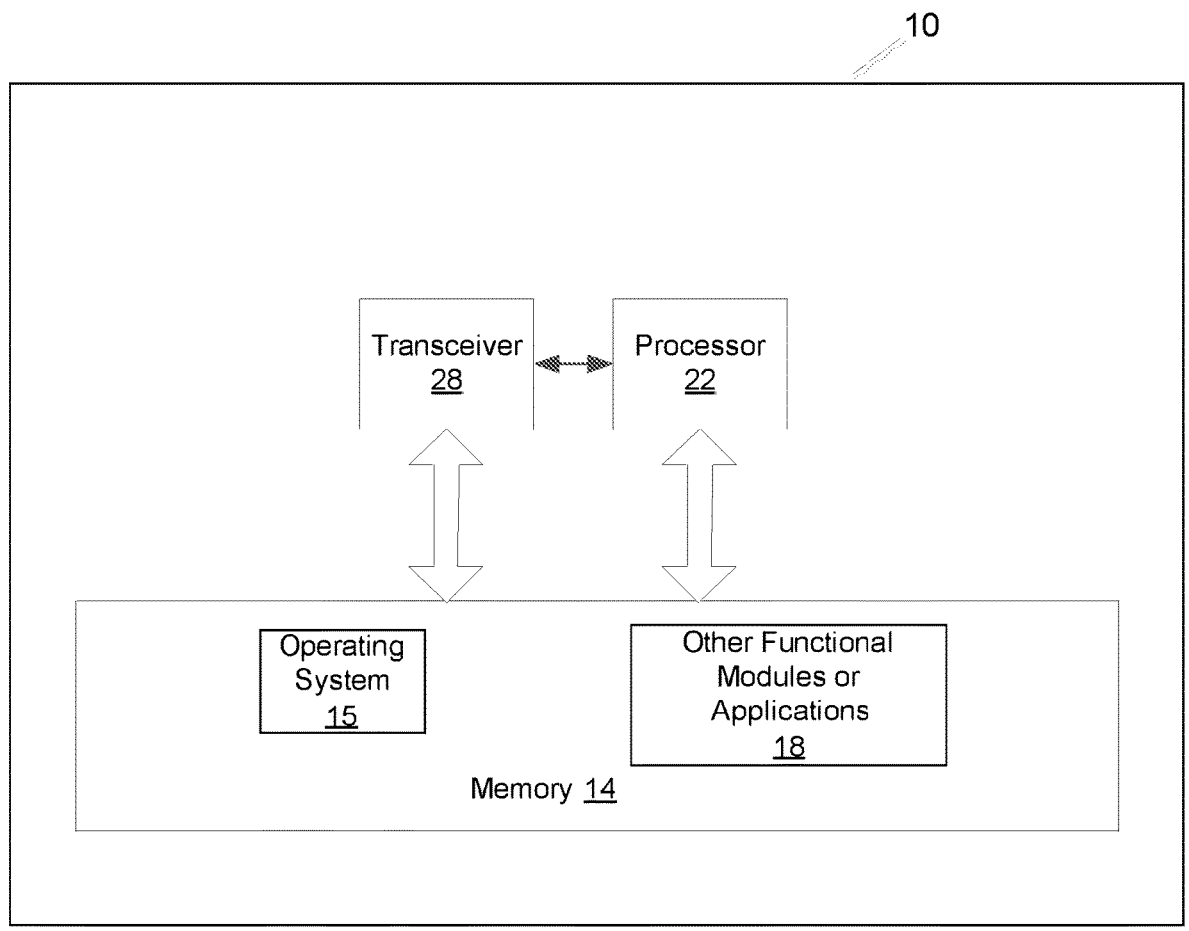
FIG. 4 illustrates an apparatus in accordance with certain embodiments of the invention.

FIG. 4 illustrates an apparatus 10 according to another embodiment. In an embodiment, apparatus 10 may be a network node (such as a RAN), for example. In another embodiment, apparatus 10 may be a user equipment.

Apparatus 10 includes a processor 22 for processing information and executing instructions or operations. Processor 22 may be any type of general or specific purpose processor. While a single processor 22 is shown in FIG. 4, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

In one embodiment, apparatus 10 may be configured to provide a multi-dimensional descriptor to a network function. Apparatus 10 may also be configured to access a network slice, wherein the network slice is selected based on the multi-dimensional descriptor. Apparatus 10 may also be configured to access a component of the network slice, wherein one or more network functions of the network slice are selected based on the multi-dimensional descriptor.

In another embodiment, apparatus 10 may be configured to receive a multi-dimensional descriptor from a user equipment. Apparatus 10 may also be configured to select a network slice for the user equipment. The network slice is selected based on the multi-dimensional descriptor. Apparatus 10 may also be configured to select a component of the network slice, for the user equipment, wherein one or more network functions of the network slice are selected based on the multi-dimensional descriptor.

Figure 5:
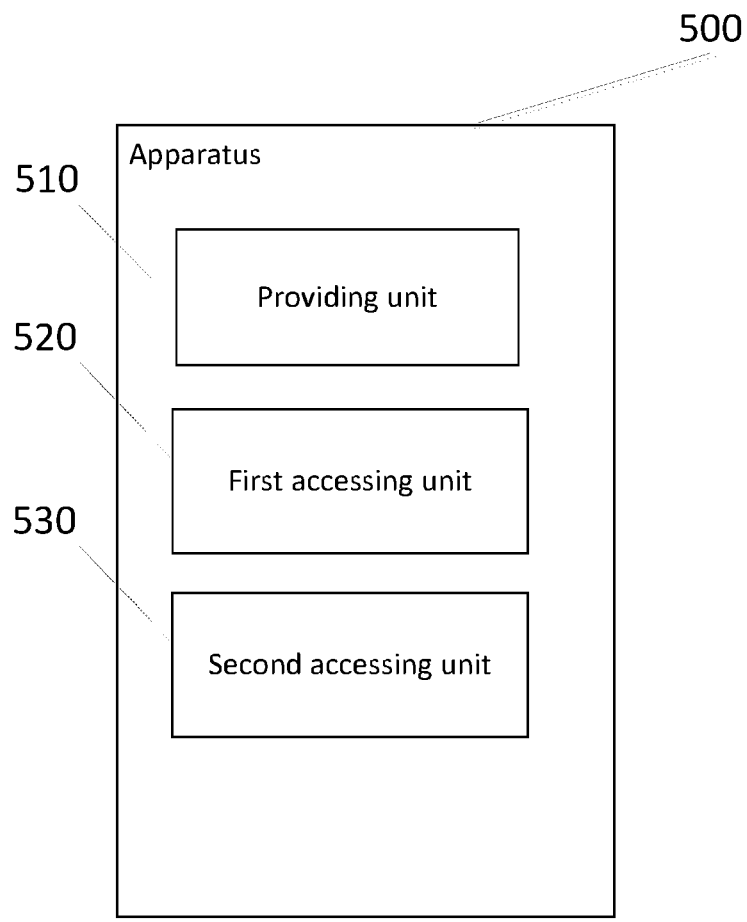
FIG. 5 illustrates another apparatus in accordance with certain embodiments of the invention.

FIG. 5 illustrates another apparatus in accordance with certain embodiments of the invention. Apparatus 500 can be a user equipment, for example. Apparatus 500 can include a providing unit 510 that provides a multi-dimensional descriptor to a network function. Apparatus 500 may also include a first accessing unit 520 that accesses a network slice. The network slice is selected based on the multi-dimensional descriptor. Apparatus 500 may also include a second accessing unit 530 that accesses a component of the network slice, wherein one or more network functions of the network slice are selected based on the multi-dimensional descriptor.

Figure 6:
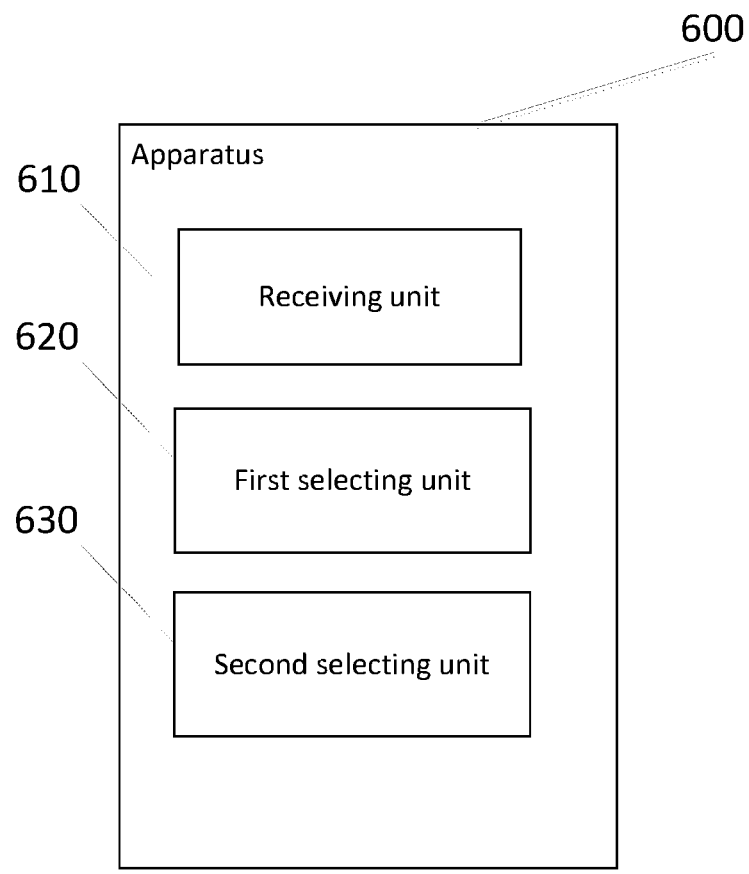
FIG. 6 illustrates another apparatus in accordance with certain embodiments of the invention.

FIG. 6 illustrates another apparatus in accordance with certain embodiments of the invention. Apparatus 600 can be a network node, for example. Apparatus 600 can include a receiving unit 610 that receives a multi-dimensional descriptor from a user equipment. Apparatus 600 can also include a first selecting unit 620 that selects a network slice for the user equipment, wherein the network slice is selected based on the multi-dimensional descriptor. Apparatus 600 can also include a second selecting unit 630 that selects a component of the network slice, for the user equipment, wherein one or more network functions of the network slice are selected based on the multi-dimensional descriptor.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
providing, by a user equipment, a multi-dimensional descriptor to a network function;
accessing a network slice, wherein the network slice is selected based on the multi-dimensional descriptor; and
accessing a component of the network slice, wherein one or more network functions of the network slice are selected based on the multi-dimensional descriptor,
wherein the user equipment requests at least one of a service requiring session continuity, a service that requires an efficient user plane path, and a service requiring a session on demand.

2. The method according to claim 1, wherein the network function comprises a radio access network function.

3. The method according to claim 1, wherein the accessing the network slice comprises accessing a network slice that is selected based on selection parameters provided by the user equipment.

4. A computer program product, embodied on a non-transitory computer readable medium, the computer program product configured to control a processor to perform a method according to claim 1.

5. An apparatus, comprising:
at least one processor; and
at least one memory including computer program code,
the at least one memory and the computer program code configured, with the at least one processor, to cause the apparatus at least to provide a multi-dimensional descriptor to a network function;
access a network slice, wherein the network slice is selected based on the multi-dimensional descriptor; and
access a component of the network slice, wherein one or more network functions of the network slice are selected based on the multi-dimensional descriptor,
wherein the apparatus requests at least one of a service requiring session continuity, a service that requires an efficient user plane path, and a service requiring a session on demand.

6. The apparatus according to claim 5, wherein the network function comprises a radio access network function.

7. The apparatus according to claim 5, wherein the accessing the network slice comprises accessing a network slice that is selected based on selection parameters provided by the apparatus.

8. A method, comprising:
receiving, by a network node, a multi-dimensional descriptor from a user equipment;
selecting a network slice for the user equipment, wherein the network slice is selected based on the multi-dimensional descriptor; and selecting a component of the network slice, for the user equipment, wherein one or more network functions of the network slice are selected based on the multi-dimensional descriptor,
wherein the user equipment requests at least one of a service requiring session continuity, a service that requires an efficient user plane path, and a service requiring a session on demand.

9. The method according to claim 8, wherein the network node comprises a radio access network node or a network function.

10. The method according to claim 8, wherein the selecting the network slice comprises selecting a network slice that is selected based on selection parameters provided by the user equipment.

11. A computer program product, embodied on a non-transitory computer readable medium, the computer program product configured to control a processor to perform a method according to claim 8.

12. An apparatus, comprising:
at least one processor; and
at least one memory including computer program code,
the at least one memory and the computer program code configured, with the at least one processor, to cause the apparatus at least to receive a multi-dimensional descriptor from a user equipment;
select a network slice for the user equipment, wherein the network slice is selected based on the multi-dimensional descriptor; and
select a component of the network slice, for the user equipment, wherein one or more network functions of the network slice are selected based on the multi-dimensional descriptor,
wherein the user equipment requests at least one of a service requiring session continuity, a service that requires an efficient user plane path, and a service requiring a session on demand.

13. The apparatus according to claim 12, wherein the apparatus comprises a radio access network node or a network function.

14. The apparatus according to claim 12, wherein the selecting the network slice comprises selecting a network slice that is selected based on selection parameters provided by the user equipment.

* * * * *